US011557995B2

United States Patent
Collopy (10) Patent No.: US 11,557,995 B2
(45) Date of Patent: Jan. 17, 2023

(54) AIRCRAFT ENGINE POWER-ASSIST START STABILITY CONTROL

(71) Applicant: Raytheon Technologies Corporation, Farmington, CT (US)

(72) Inventor: Gary Collopy, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 66 days.

(21) Appl. No.: 16/991,077

(22) Filed: Aug. 12, 2020

(65) Prior Publication Data
US 2021/0050810 A1    Feb. 18, 2021

Related U.S. Application Data

(60) Provisional application No. 62/885,787, filed on Aug. 12, 2019.

(51) Int. Cl.
*H02P 9/08* (2006.01)
*B64D 27/02* (2006.01)
(Continued)

(52) U.S. Cl.
CPC ............... *H02P 9/08* (2013.01); *B60L 50/40* (2019.02); *B60L 50/60* (2019.02); *B64D 27/02* (2013.01);
(Continued)

(58) Field of Classification Search
CPC .... H02P 9/08; H02P 2101/25; H02P 2101/30; B60L 50/40; B60L 50/60; B60L 2200/10;
(Continued)

(56) References Cited

U.S. PATENT DOCUMENTS 6,931,856 B2    8/2005    Belokon
9,938,850 B2    4/2018    Edwards
(Continued)

FOREIGN PATENT DOCUMENTS

EP    3255282 A1    12/2017
EP    3415436 A1    12/2018
(Continued)

OTHER PUBLICATIONS

GB Application No. GB2012553.0 Combined Search and Examination Report dated Feb. 12, 2021, 5 pages.

*Primary Examiner* — Charles Reid, Jr.
(74) *Attorney, Agent, or Firm* — Cantor Colburn LLP (57) ABSTRACT

A hybrid electric propulsion system includes a gas turbine engine having a low speed spool and a high speed spool. The low speed spool includes a low pressure compressor and a low pressure turbine, and the high speed spool includes a high pressure compressor and a high pressure turbine. The hybrid electric propulsion system also includes an energy storage system, an electric motor configured to augment rotational power of the high speed spool, and a controller. The controller is operable to detect a start condition of the gas turbine engine, control power delivery from the energy storage system to the electric motor based on detecting the start condition, and provide a compressor stall margin using a power-assist provided by the electric motor to the high speed spool over a targeted speed range during starting of the gas turbine engine.

18 Claims, 6 Drawing Sheets

(51) Int. Cl.
  *B64D 27/10* (2006.01)
  *B64D 27/24* (2006.01)
  *B64D 31/06* (2006.01)
  *B60L 50/40* (2019.01)
  *B60L 50/60* (2019.01)
  *H02P 101/30* (2015.01)
  *H02P 101/25* (2016.01)

(52) U.S. Cl.
  CPC .............. *B64D 27/10* (2013.01); *B64D 27/24* (2013.01); *B64D 31/06* (2013.01); *B60L 2200/10* (2013.01); *B64D 2027/026* (2013.01); *H02P 2101/25* (2015.01); *H02P 2101/30* (2015.01)

(58) Field of Classification Search
  CPC ........ B64D 27/02; B64D 27/10; B64D 27/24; B64D 31/06; B64D 2027/026
  USPC .................................. 290/46, 47, 48, 50, 51
  See application file for complete search history.

(56) References Cited

U.S. PATENT DOCUMENTS

| | | | |
|---|---|---|---|
| 10,196,923 B2 | 2/2019 | Thomassin | |
| 10,309,304 B2 | 6/2019 | Bourne | |
| 2008/0276620 A1 | 11/2008 | Ullyott et al. | |
| 2009/0289456 A1* | 11/2009 | McLoughlin | F02C 7/36 290/46 |
| 2010/0133832 A1* | 6/2010 | Butt | F02K 3/072 290/46 |
| 2013/0076035 A1* | 3/2013 | Koenig | F02C 7/32 290/34 |
| 2013/0098060 A1 | 4/2013 | Suciu | |
| 2013/0236296 A1* | 9/2013 | Collopy | F02C 9/20 415/162 |
| 2018/0354632 A1* | 12/2018 | Hon | B64D 27/24 |
| 2019/0360462 A1* | 11/2019 | Epstein | F03D 7/045 |

FOREIGN PATENT DOCUMENTS

| | | | | |
|---|---|---|---|---|
| EP | 3530910 A1 | | 8/2019 | |
| EP | 3569845 A1 | * | 11/2019 | ............... F02K 5/00 |
| EP | 3611366 A1 | | 2/2020 | |
| FR | 2688827 A1 | * | 9/1993 | ........... F01D 17/162 |
| GB | 1472033 A | | 4/1977 | |

\* cited by examiner

AIRCRAFT ENGINE POWER-ASSIST START STABILITY CONTROL

CROSS-REFERENCE TO RELATED APPLICATION

This application claims the benefit of priority to U.S. Provisional Application No. 62/885,787 filed Aug. 12, 2019, the disclosure of which is incorporated herein by reference in its entirety.

BACKGROUND

The subject matter disclosed herein generally relates to rotating machinery and, more particularly, to a method and an apparatus for aircraft engine power-assist start stability control.

Gas turbine engines typically include multiple spools with a compressor section and a turbine section on opposite sides of a combustor section in an engine core. As an example, in a two-spool design, fuel in air that has been compressed by a low pressure compressor (LPC) followed by a high pressure compressor (HPC) of the compressor section is combusted. The combustion takes place in the combustor section to create heated gases with increased pressure and density. The heated gases are used to rotate a high pressure turbine (HPT) followed by a low pressure turbine (LPT) in the turbine section that are used to produce thrust or power. Air flows through the compressor and turbine sections differ at various operating conditions of an engine, with more air flow being required at higher output levels and vice versa. To maintain compressor stability, engine bleeds are typically used to extract engine bleed air; however, the use of engine bleeds can detract from performance and efficiency of an engine.

Some engine bleeds, such as stability bleeds or start bleeds, are primarily used during engine starting to increase HPC stall margin as the high speed rotor of the engine increases in speed. Air extracted from stability bleeds is typically dumped overboard and requires dedicated ports, valves, ducting, and the like. Stability bleeds can result in surplus HPC stall margin at some operating speeds, which can result in reduced operating efficiency.

BRIEF DESCRIPTION

According to one embodiment, a hybrid electric propulsion system includes a gas turbine engine having a low speed spool and a high speed spool. The low speed spool includes a low pressure compressor and a low pressure turbine, and the high speed spool includes a high pressure compressor and a high pressure turbine. The hybrid electric propulsion system also includes an energy storage system, an electric motor configured to augment rotational power of the high speed spool, and a controller. The controller is operable to detect a start condition of the gas turbine engine, control power delivery from the energy storage system to the electric motor based on detecting the start condition, and provide a compressor stall margin using a power-assist provided by the electric motor to the high speed spool over a targeted speed range during starting of the gas turbine engine.

In addition to one or more of the features described above or below, or as an alternative, further embodiments may include where the controller is configured to control power delivery from the energy storage system to the electric motor to meet a torque demand for the targeted speed range.

In addition to one or more of the features described above or below, or as an alternative, further embodiments may include where the compressor stall margin is a minimum required stall margin of the high pressure compressor.

In addition to one or more of the features described above or below, or as an alternative, further embodiments may include where the energy storage system is within a control volume of the gas turbine engine autonomous of external control intervention and an external power source.

In addition to one or more of the features described above or below, or as an alternative, further embodiments may include where the controller is a full authority digital engine control that has authority over power delivery from the energy storage system.

In addition to one or more of the features described above or below, or as an alternative, further embodiments may include a gearbox coupled to the electric motor and the high speed spool.

In addition to one or more of the features described above or below, or as an alternative, further embodiments may include where the electric motor is configurable between a motor mode of operation and a generator mode of operation.

In addition to one or more of the features described above or below, or as an alternative, further embodiments may include a low spool electric motor operably coupled to the low speed spool, where the low spool electric motor is configurable to augment rotational power of the low speed spool.

In addition to one or more of the features described above or below, or as an alternative, further embodiments may include where the energy storage system includes a battery.

In addition to one or more of the features described above or below, or as an alternative, further embodiments may include where the energy storage system includes a capacitor.

According to another embodiment, a method includes detecting a start condition of a gas turbine engine. Power delivery is controlled from an energy storage system to an electric motor based on detecting the start condition, where the electric motor is configured to augment rotational power of the high speed spool. A compressor stall margin is provided using a power-assist provided by the electric motor to the high speed spool over a targeted speed range during starting of the gas turbine engine, where the energy storage system and electric motor provide power to start the gas turbine engine without the high pressure compressor using a start/stability bleed system.

In addition to one or more of the features described above or below, or as an alternative, further embodiments may include controlling power delivery from the energy storage system to the electric motor to meet a torque demand for the targeted speed range.

In addition to one or more of the features described above or below, or as an alternative, further embodiments may include controlling a low spool electric motor to augment rotational power of a low speed spool of the gas turbine engine.

A technical effect of the apparatus, systems and methods is achieved by controlling a starting spool power-assist system for starting a gas turbine engine of a propulsion system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
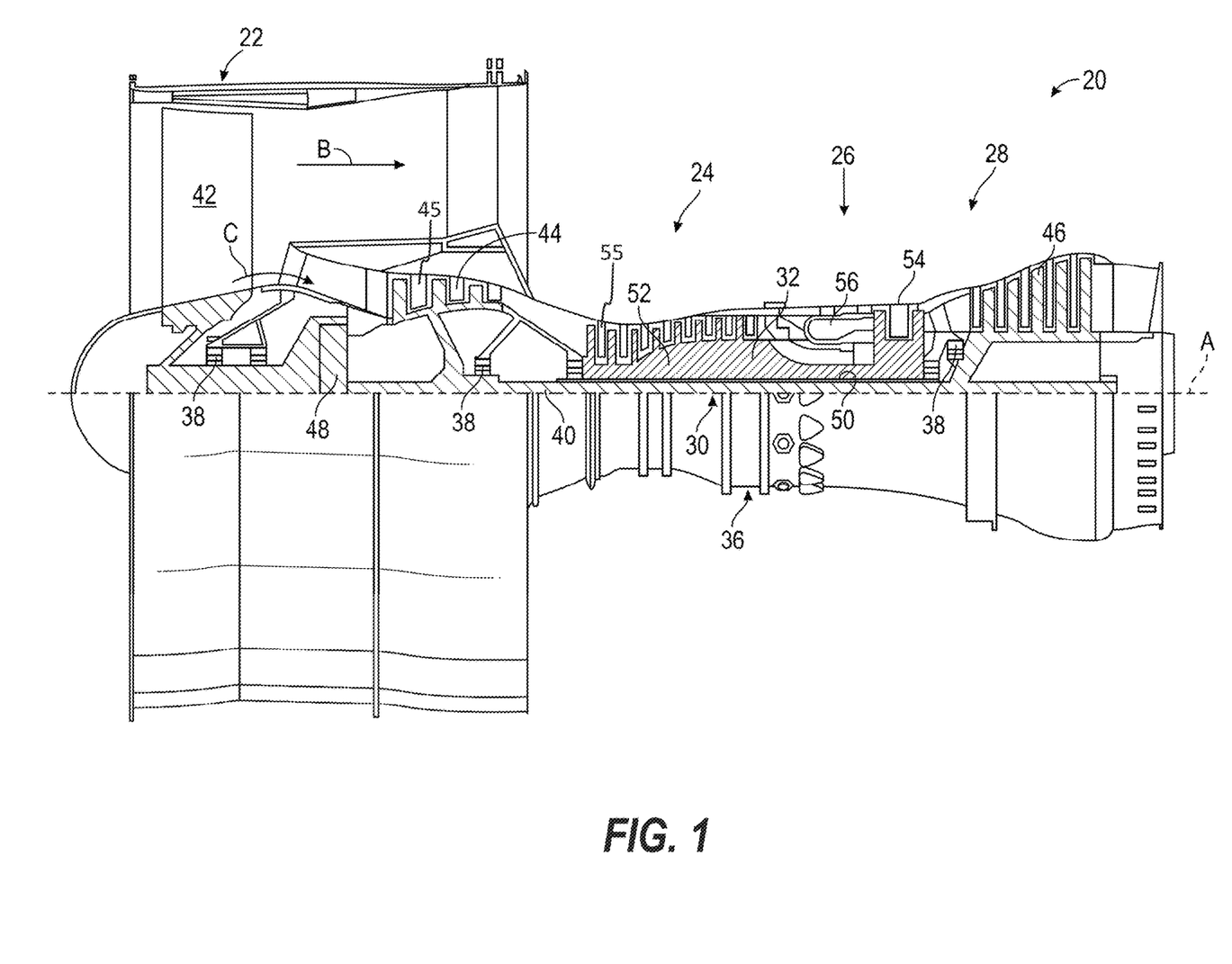
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than about ten (10), a geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system.

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
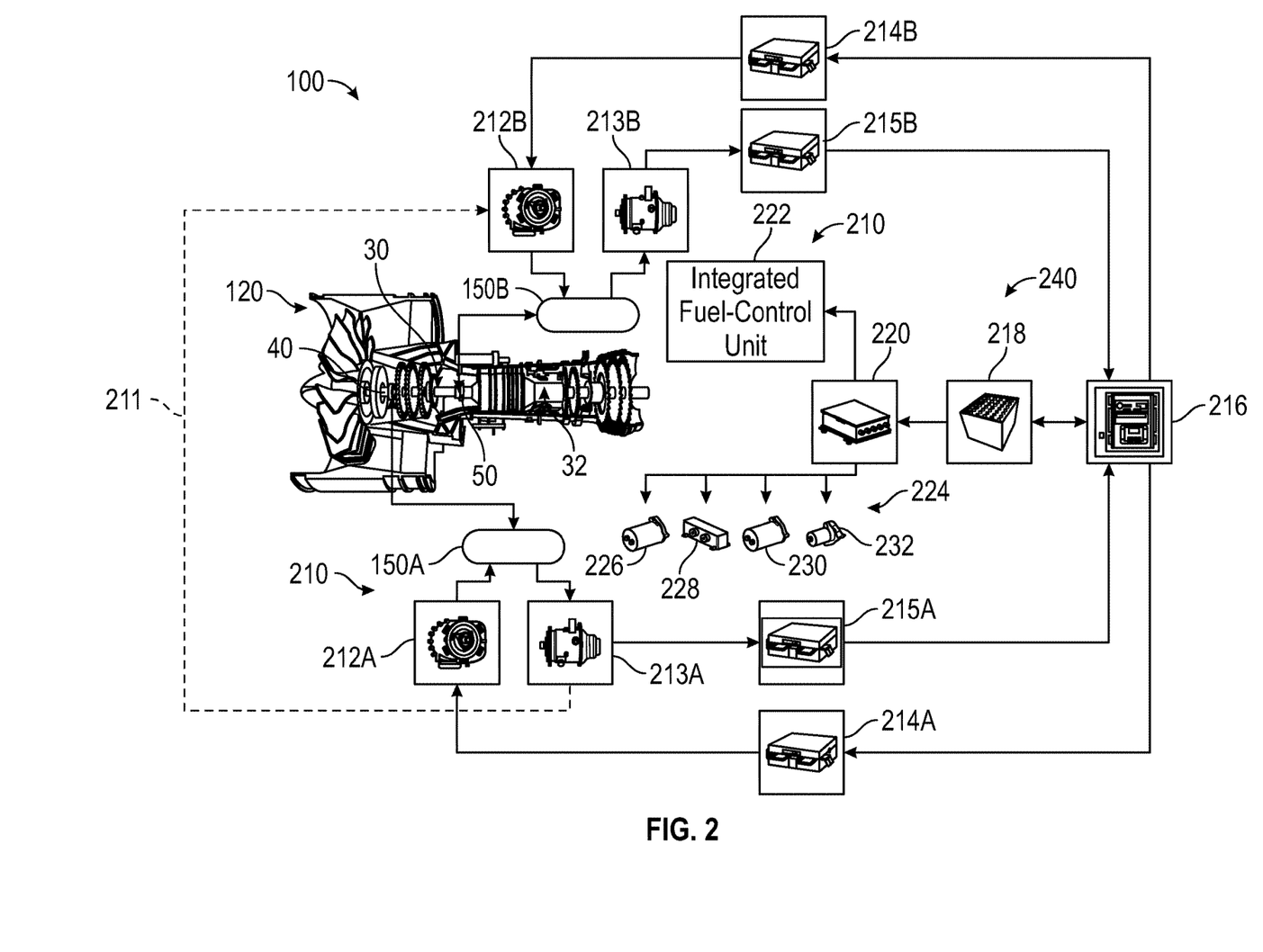
FIG. 2 is a schematic diagram of a hybrid electric propulsion system with physical power flow connections (electrical and mechanical power), in accordance with an embodiment of the disclosure.

FIG. 2 illustrates a hybrid electric propulsion system 100 (also referred to as hybrid gas turbine engine 100) including a gas turbine engine 120 operably coupled to an electrical power system 210 as part of a hybrid electric aircraft. One or more mechanical power transmissions 150 (e.g., 150A, 150B) can be operably coupled between the gas turbine engine 120 and the electrical power system 210. The gas turbine engine 120 can be an embodiment of the gas turbine engine 20 of FIG. 1 and includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50 as depicted in FIG. 1). The electrical power system 210 can include a first electric motor 212A (also referred to as a low spool electric motor) configured to augment rotational power of the low speed spool 30 and a second electric motor 212B (also referred to as a high spool electric motor) configured to augment rotational power of the high speed spool 32. Although two electric motors 212A, 212B are depicted in FIG. 2, it will be understood that there may be only a single electric motor (e.g., only electric motor 212B) or additional electric motors (not depicted). The electrical power system 210 can also include a first electric generator 213A configured to convert rotational power of the low speed spool 30 to electric power and a second electric generator 213B configured to convert rotational power of the high speed spool 32 to electric power. Although two electric generators 213A, 213B are depicted in FIG. 2, it will be understood that there may be only a single electric generator (e.g., only electric generator 213A) or additional electric generators (not depicted). In some embodiments, one or more of the electric motors 212A, 212B can be configured as a motor or a generator depending upon an operational mode or system configuration, and thus one or more of the electric generators 213A, 213B may be omitted.

In the example of FIG. 2, the mechanical power transmission 150A includes a gearbox operably coupled between the inner shaft 40 and a combination of the first electric motor 212A and first electric generator 213A. The mechanical power transmission 150B can include a gearbox operably coupled between the outer shaft 50 and a combination of the second electric motor 212B and second electric generator 213B. In embodiments where the electric motors 212A, 212B are configurable between a motor and generator mode of operation, the mechanical power transmission 150A, 150B can include a clutch or other interfacing element(s).

The electrical power system 210 can also include motor drive electronics 214A, 214B operable to condition current to the electric motors 212A, 212B (e.g., DC-to-AC converters). The electrical power system 210 can also include rectifier electronics 215A, 215B operable to condition current from the electric generators 213A, 213B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B, 215A, 215B. The energy storage system 218 can include one or more energy storage devices, such as a battery, a super capacitor, an ultra capacitor, and the like. The energy storage management system 216 can facilitate various power transfers within the hybrid electric propulsion system 100. For example, power from the first electric generator 213A can be transferred 211 to the second electric motor 212B as a low speed spool 30 to high speed spool 32 power transfer. Other examples of power transfers may include a power transfer from the second electric generator 213B to the first electric motor 212A as a high speed spool 32 to low speed spool 30 power transfer.

A power conditioning unit 220 and/or other components can be powered by the energy storage system 218. The hybrid electric system control effectors 240 can include the electric motors 212A, 212B, electric generators 213A, 213B, integrated fuel control unit 222, actuators 224 (e.g., actuator 226, actuator 228, actuator 230, actuator 232) and/or other elements (not depicted).

Figure 3:
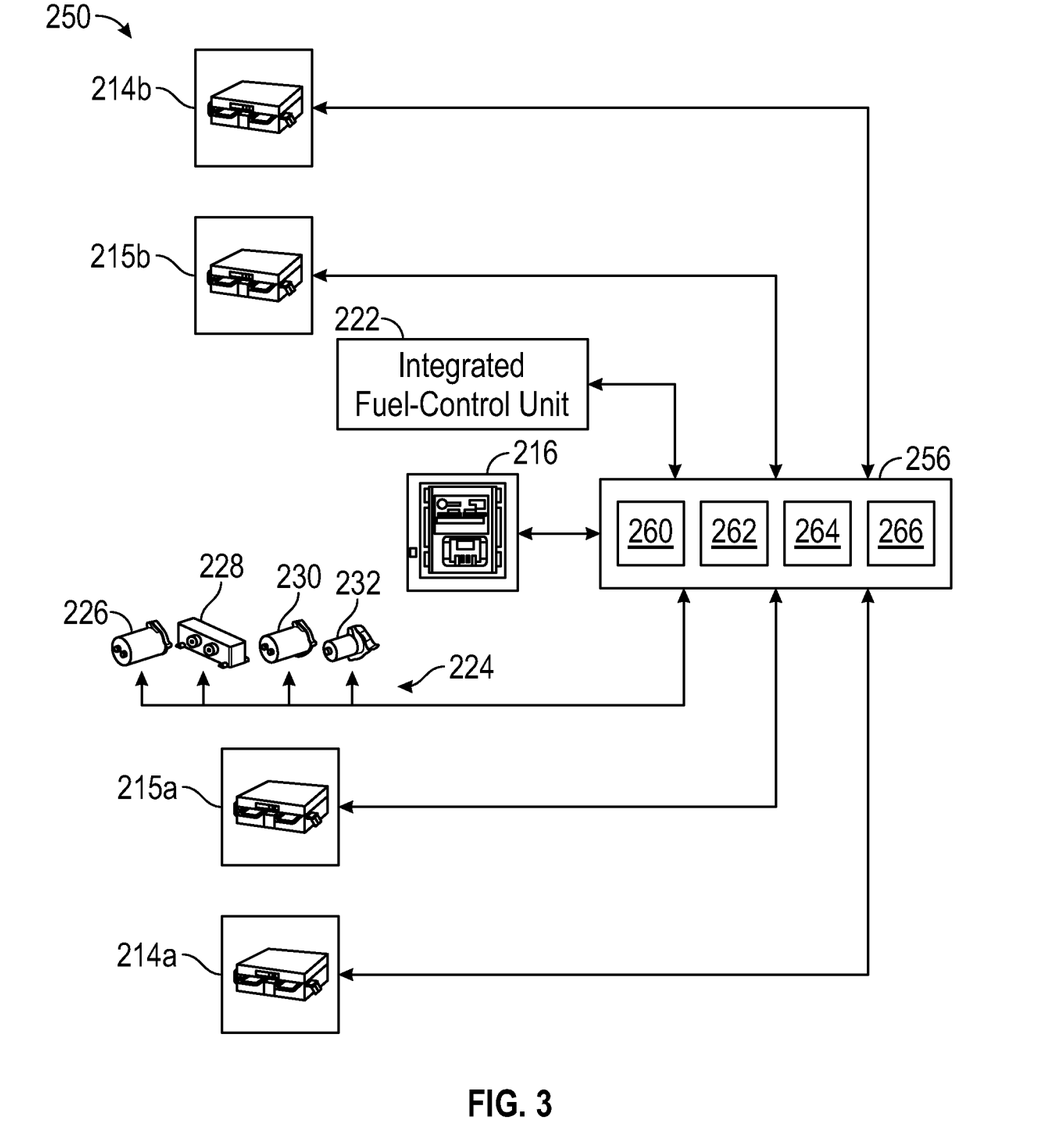
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2 and is described with continued reference to FIGS. 1 and 2. A controller 256 can interface with the motor drive electronics 214A, 214B, rectifier electronics 215A, 215B, energy storage management system 216, integrated fuel control unit 222, actuators 224, and/or other components (not depicted) of the hybrid electric propulsion system 100. In embodiments, the controller 256 can control and monitor for fault conditions of the gas turbine engine 120 and/or the electrical power system 210. For example, the controller 256 can be integrally formed or otherwise in communication with a full authority digital engine control (FADEC) of the gas turbine engine 120. In embodiments, the controller 256 can include a processing system 260, a memory system 262, and an input/output interface 264. The controller 256 can also include various operational controls, such as a starter control 266 that controls the starting of the gas turbine engine 120 using a power assist from the second electric motor 212B and energy stored in the energy storage system 218 as further described herein.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, actuators 224, and/or other components (not depicted) of the hybrid electric propulsion system 100. The controller 256 provides a means for controlling the hybrid electric system control effectors 240 based on dynamic updates during operation of the hybrid electric propulsion system 100. The means for controlling the hybrid electric system control effectors 240 can be otherwise subdivided, distributed, or combined with other control elements.

The starter control 266 can apply control laws and access/update models to determine how to control and transfer power from the energy storage system 218 to the second electric motor 212B. For example, sensed and/or derived parameters related to speed, flow rate, pressure ratios, temperature, thrust, and the like can be used to establish operational schedules and transition limits to maintain efficient operation of the gas turbine engine 120. The starter control 266 can detect a start condition based on a pilot command or other event indicative of need to initiated starting. To provide operational stability of the compressor section 24 of FIG. 1, the starter control 266 can control the second electric motor 212B to selectively transfer power to the high speed spool 32 of FIG. 1 as a starting spool. A compressor map or other control schedules can define relationships between multiple operating parameters of the gas turbine engine 120. Schedules may seek to operate the compressor section 24 close to a stall line under starting conditions for efficient operation without resulting in a stall event. A stall line can be considered a stability limit line or a minimum required stall margin of the high pressure compressor 52 to avoid a stall event. Rather than including one or more stability bleeds that are typically opened to control for stability, embodiments can control the second electric motor 212B to control compressor stability. Elimination of stability engine bleeds can prevent a reduced operating efficiency when the compressed bleed air would otherwise be dumped overboard or not used. Some embodiments may work in conjunction with various actuators in combination with the second electric motor 212B, such as controlling the low pressure compressor vane actuator 228 and/or the high pressure compressor vane actuator 230 to adjust vane angles of the stator vanes 45, 55 and modify a compressor ratio and/or a compressor air flow of the compressor section 26. In other embodiments, one or more stages of variable vanes can be eliminated through control of the second electric motor 212B.

Figure 4:
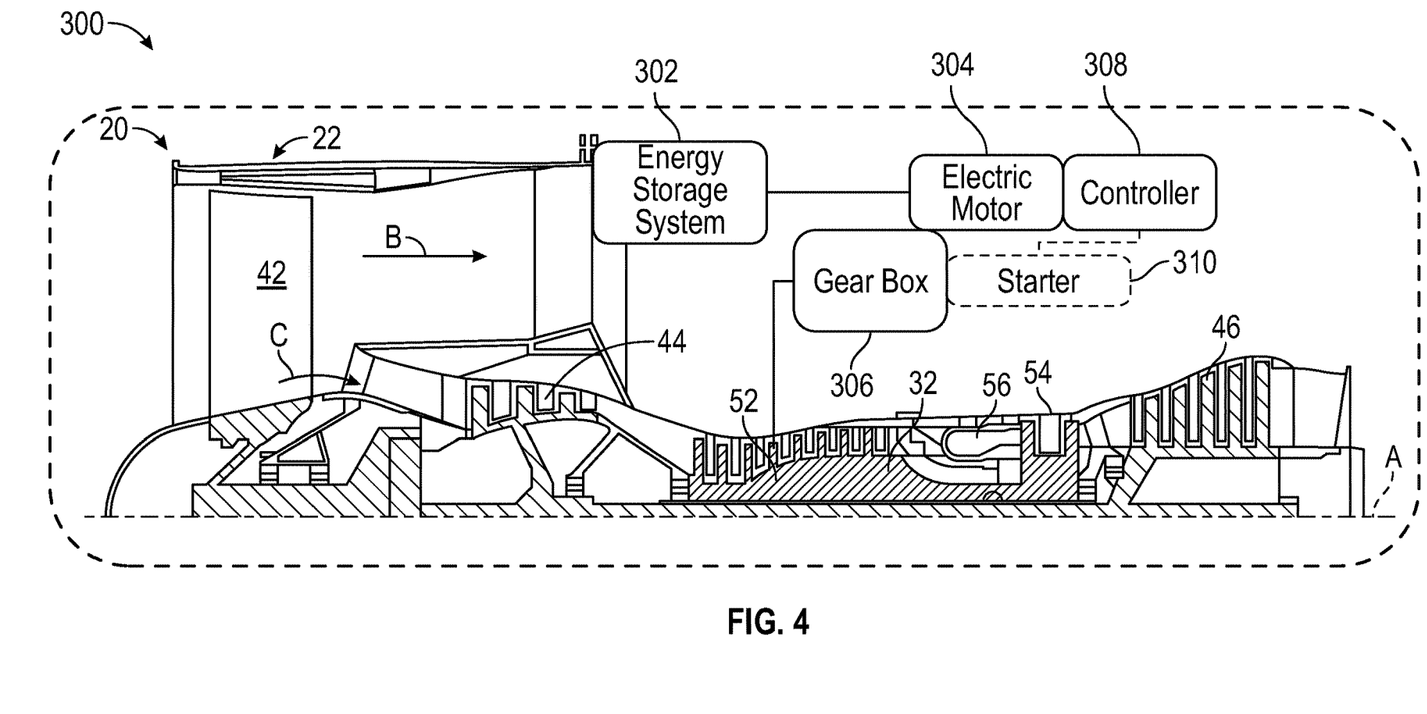
FIG. 4 is a schematic diagram of a starting spool power-assist system of a gas turbine engine, in accordance with an embodiment of the disclosure.

Referring now to FIG. 4, a starting spool power-assist system 300 is depicted coupled to the gas turbine engine 20 of FIG. 1. The starting spool power-assist system 300 is a simplified example of the electrical power system 210 of FIG. 2. The starting spool power-assist system 300 can include an energy storage system 302, an electric motor 304, and a gearbox 306. The energy storage system 302 is an example of the energy storage system 218 of FIG. 2 and may include one or more batteries and/or one or more capacitors. The energy storage system 302 can be within a control volume of the gas turbine engine 20 and need not be physically attached to the gas turbine engine 20 but is controlled by the gas turbine engine 20. The electric motor 304 is an example of the second electric motor 212B of FIG. 2. The electric motor 304 is configured to augment rotational power of the high speed spool 32. The gearbox 306 is an example of a portion of the mechanical power transmission 150b of FIG. 2. The starting spool power-assist system 300 can also include a controller 308 as an example of the controller 256 of FIG. 3 an may be implemented as a FADEC. Further, the controller 308 may incorporate aspects of the energy storage management system 216 of FIG. 3. The gearbox 306 can be coupled to the electric motor 304 and the high speed spool 32. In some embodiments, a starter 310 can be a separate component from the electric motor 304. For example, the starter 310 can be a pneumatic or electric starter controlled by controller 308 or another controller. The starter 310 may be coupled to the gearbox 306 or another component of the gas turbine engine 20 that enables the starter 310 to selectively drive rotation of the high speed spool 32. The starter 310 may be used independently or in combination with the electric motor 304. Additional components may be included, such as a clutch and/or various accessories (not depicted), which can be coupled to the gearbox 306, for instance.

Figure 5:
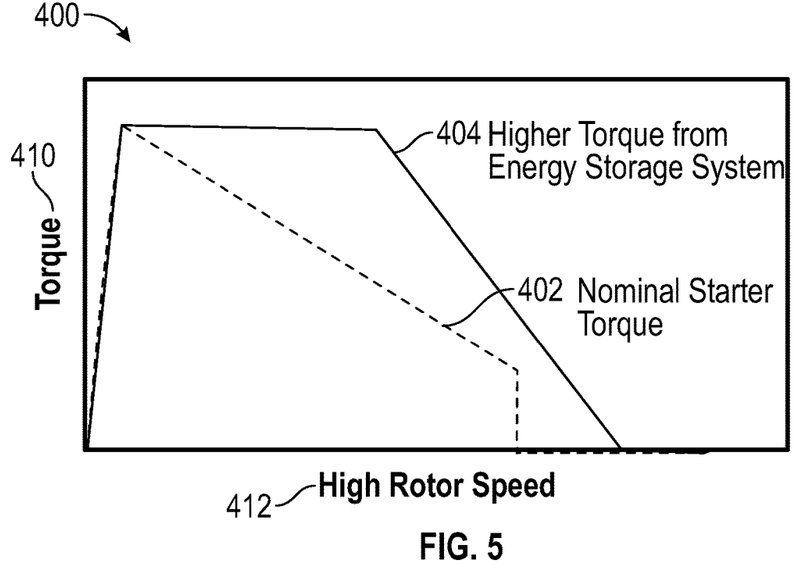
FIG. 5 is a plot that graphically illustrates a relationship between torque and rotor speed in a gas turbine engine, in accordance with an embodiment of the disclosure.

Referring now to FIG. 5, plot 400 graphically illustrates a relationship between torque and rotor speed in a gas turbine engine, such as the gas turbine engine 20, 120 of FIGS. 1 and 2. Line 402 illustrates an example relationship between a torque 410 and high rotor speed 412 of the high pressure compressor 52 under normal operating conditions where stability bleeds are used during starting. Line 404 illustrates an example relationship between the torque 410 and the high rotor speed 412 of the high pressure compressor 52 using the electric motor 304 powered by the energy storage system 302 to increase torque during engine starting.

Figure 6:
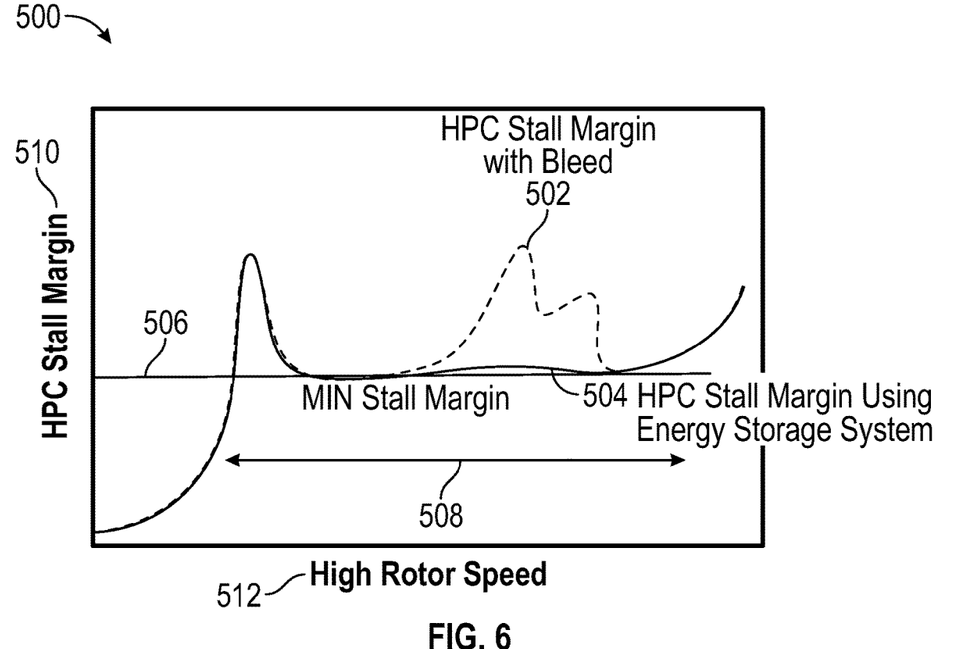
FIG. 6 is a plot that graphically illustrates a relationship between stall margin and rotor speed in a gas turbine engine, in accordance with an embodiment of the disclosure.

Referring now to FIG. 6, plot 500 graphically illustrates a relationship between stall margin and rotor speed in a gas turbine engine, such as the gas turbine engine 20, 120 of FIGS. 1 and 2. Line 502 illustrates an example relationship between high pressure compressor stall margin 510 and high rotor speed 512 under normal operating conditions where stability bleeds are used during starting. Line 504 illustrates an example relationship between high pressure compressor stall margin 510 and high rotor speed 512 using the electric motor 304 powered by the energy storage system 302 to maintain a compressor stall margin above a minimum stall margin 506 using a power-assist provided by the electric motor 304 to the high speed spool 32 over a targeted speed range 508 during starting of the gas turbine engine.

Figure 7:
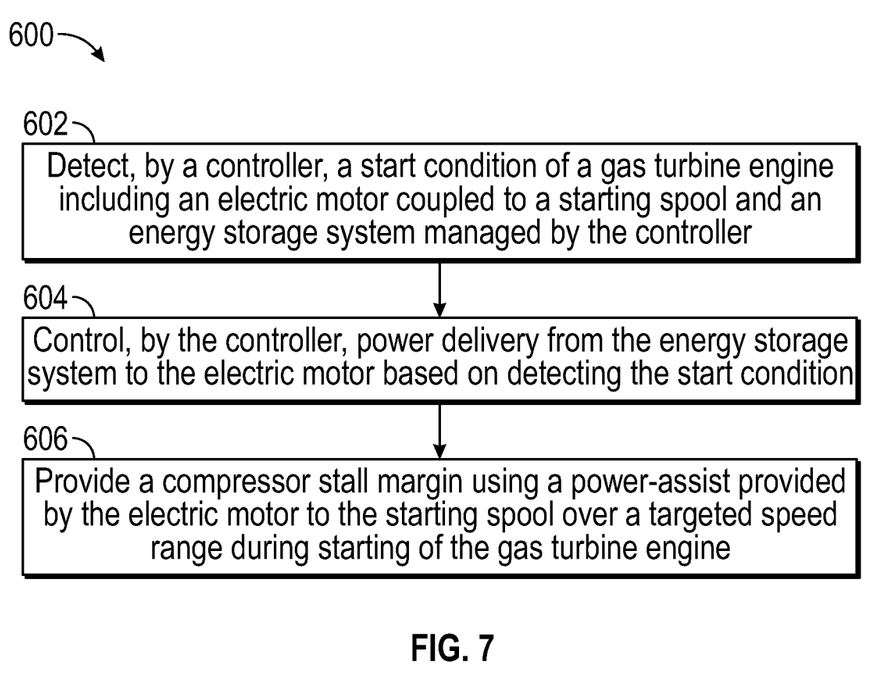
FIG. 7 is a flow chart illustrating a method, in accordance with an embodiment of the disclosure.

Referring now to FIG. 7 with continued reference to FIGS. 1-6, FIG. 7 is a flow chart illustrating a method 600 in accordance with an embodiment. The method 600 may be performed, for example, by the hybrid electric propulsion system 100 of FIG. 2 and/or the starting spool power-assist system 300 of FIG. 4. For purposes of explanation, the method 600 is described primarily with respect to the hybrid electric propulsion system 100 of FIG. 2; however, it will be understood that the method 600 can be performed on other configurations (not depicted).

Method 600 pertains to the controller 256 executing embedded code for the starter control 266. At block 602, controller 256 can detect a start condition of the gas turbine engine 120 including an electric motor 212b coupled to a starting spool and an energy storage system 218 managed by the controller 256. The starting spool can be the low speed spool 30, the high speed spool 32, or an intermediate spool (not depicted).

At block 604, the controller 256 can control power delivery from the energy storage system 218 to the electric motor 212b based on detecting the start condition. The starting condition can be a pilot request, a received command, or a detected condition.

At block 606, the controller 256 can provide a compressor stall margin using a power-assist provided by the electric motor 212b to the starting spool, such as high speed spool 32, over a targeted speed range during starting of the gas turbine engine. The compressor stall margin can be a minimum required stall margin of the high pressure compressor 52.

In embodiments, a stability bleed system of a gas turbine engine can be reduced or eliminated. Stability bleed system elimination can reduce a number of ports, valves, and ducts needed on a gas turbine engine. Rather than relying upon an auxiliary power unit (APU) to provide pneumatic or electric power, embodiments can use an energy storage system that is controlled by an engine controller. Avoiding the use of an external power source for engine starting can reduce ducting and cabling requirements of a gas turbine engine. Using a battery or capacitor to store power can result in providing a power-assist to the starting spool (e.g., high speed spool) while meeting compressor stability requirements that would otherwise be provided by a stability bleed system with stability bleed valves. Electrical power provided by the energy storage source can be more than the power from a nominal starter and can power the engine autonomously without external assist, such as APU, ground cart, and opposite engine (cross-bleed start). Embodiments can avoid pilot or aircraft control intervention in the engine start process. High pressure spool power assist can achieve bleed elimination by lowering the high pressure compressor operating line as much as the bleed, to equivalent stall margin, at a level that allows the engine to start in the required time. An engine FADEC can have full control over the power source and eliminate the need for external power source and pilot or aircraft control intervention during start.

In some embodiments, another lower level of power assist is supplied where compressor bleed size is reduced from nominal, but not completely eliminated. As an alternative, an existing pneumatic starter (e.g., starter 310 of FIG. 4) can be larger than a nominal system, and APU power can be larger by the same amount, enough to eliminate one or more compressor bleed. Alternatively, an existing electric starter (e.g., starter 310 of FIG. 4) can be larger than nominal, and APU power can be larger by the same amount, enough to eliminate the stability compressor bleed system. As further alternative, a pneumatic starter can be replaced with an electric starter, either supplied by an external source (APU, ground cart, opposite engine cross-bleed) or internal source (battery, capacitor), where the engine control decides which source powers the starter, such as starter 310 of FIG. 4. The combined power can be enough to meet start time without a compressor bleed.

While the above description has described the flow process of FIG. 7 in a particular order, it should be appreciated that unless otherwise specifically required in the attached claims that the ordering of the steps may be varied. Also, it is clear to one of ordinary skill in the art that, the stability enhancement provided by the dynamic torque and power capability of the coupled electric motor system described herein can be combined with and enhance other surge control features, such as surge control valves, variable stators, and fuel flow control.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric propulsion system comprising:
a gas turbine engine comprising a low speed spool and a high speed spool, the low speed spool comprising a low pressure compressor and a low pressure turbine, and the high speed spool comprising a high pressure compressor and a high pressure turbine, a plurality of stator vanes, and one or more vane actuators;
an energy storage system;
an electric motor configured to augment rotational power of the high speed spool; and
a controller operable to:
detect a start condition of the gas turbine engine;
control power delivery from the energy storage system to the electric motor based on detecting the start condition; and
control the electric motor to provide a power-assist to the high speed spool over a targeted speed range during starting of the gas turbine engine by:
controlling power delivery from the energy storage system to the electric motor to meet a torque demand for the targeted speed range of the high speed spool; and
controlling the one or more vane actuators to adjust vanes angles of the stator vanes in combination with controlling the electric motor to modify a compressor ratio and/or a compressor air flow to control compressor stability of the gas turbine engine, wherein the energy storage system and electric motor provide power to start the gas turbine engine without the high pressure compressor using a start/stability bleed system to control for stability.

2. The hybrid electric propulsion system of claim 1, wherein the controller is configured to provide stability control to maintain a compressor stall margin above a minimum stall margin the high pressure compressor.

3. The hybrid electric propulsion system of claim 1, wherein the energy storage system is controlled by the gas turbine engine autonomous of external control intervention and an external power source.

4. The hybrid electric propulsion system of claim 1, wherein the controller is a full authority digital engine control that has authority over power delivery from the energy storage system.

5. The hybrid electric propulsion system of claim 1, further comprising a gearbox coupled to the electric motor and the high speed spool.

6. The hybrid electric propulsion system of claim 1, wherein the electric motor is configurable between a motor mode of operation and a generator mode of operation.

7. The hybrid electric propulsion system of claim 1, further comprising a low spool electric motor operably coupled to the low speed spool, wherein the low spool electric motor is configurable to augment rotational power of the low speed spool.

8. The hybrid electric propulsion system of claim 1, wherein the energy storage system comprises a battery.

9. The hybrid electric propulsion system of claim 1, wherein the energy storage system comprises a capacitor.

10. A method comprising:
detecting a start condition of a gas turbine engine;
controlling power delivery from an energy storage system to an electric motor based on detecting the start condition, wherein the electric motor is configured to augment rotational power of a high speed spool of the gas turbine engine; and
controlling power delivery from the energy storage system to the electric motor to provide a power-assist to the high speed spool over a targeted speed range during starting of the gas turbine engine by:
controlling power delivery from the energy storage system to the electric motor to meet a torque demand for the targeted speed range of the high speed spool; and
controlling one or more vane actuators to adjust vanes angles of a plurality of stator vanes in combination with controlling the electric motor to modify a compressor ratio and/or a compressor air flow to control compressor stability of the gas turbine engine, wherein the energy storage system and electric motor provide power to start the gas turbine engine without a high pressure compressor of the gas turbine engine using a start/stability bleed system to control for stability.

11. The method of claim 10, wherein stability control is provided to maintain a compressor stall margin above a minimum stall margin of the high pressure compressor.

12. The method of claim 10, wherein the energy storage system is controlled by the gas turbine engine autonomous of external control intervention and an external power source.

13. The method of claim 10, wherein the method is performed by a full authority digital engine control that has authority over power delivery from the energy storage system.

14. The method of claim 10, wherein the electric motor and the high speed spool are coupled through a gearbox.

15. The method of claim 10, wherein the electric motor is configurable between a motor mode of operation and a generator mode of operation.

16. The method of claim 10, further comprising controlling a low spool electric motor to augment rotational power of a low speed spool of the gas turbine engine.

17. The method of claim 10, wherein the energy storage system comprises a battery.

18. The method of claim 10, wherein the energy storage system comprises a capacitor.

* * * * *